United States Patent
Christensson et al.

(10) Patent No.: US 9,265,025 B2
(45) Date of Patent: Feb. 16, 2016

(54) METHOD AND ARRANGEMENT IN A TELECOMMUNICATION SYSTEM

(75) Inventors: Anders Christensson, Älvsjö (SE); Andreas Bergström, Vikingstad (SE); Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1020 days.

(21) Appl. No.: 13/018,697

(22) Filed: Feb. 1, 2011

(65) Prior Publication Data

US 2011/0195709 A1    Aug. 11, 2011

Related U.S. Application Data

(60) Provisional application No. 61/303,020, filed on Feb. 10, 2010.

(51) Int. Cl.
| | |
|---|---|
| *H04W 68/00* | (2009.01) |
| *H04W 68/02* | (2009.01) |
| *H04W 84/02* | (2009.01) |
| *H04W 4/08* | (2009.01) |
| *H04W 60/02* | (2009.01) |

(52) U.S. Cl.
CPC .............. *H04W 68/00* (2013.01); *H04W 68/02* (2013.01); *H04W 4/08* (2013.01); *H04W 60/02* (2013.01); *H04W 84/027* (2013.01)

(58) Field of Classification Search
CPC ..... H04W 68/00; H04W 4/08; H04W 84/027; H04W 52/02; H04W 52/0219; H04W 74/04
USPC .............. 455/426.1, 434, 458–460, 515
See application file for complete search history.

(56) References Cited

U.S. PATENT DOCUMENTS

| | | | | |
|---|---|---|---|---|
| 5,539,748 | A * | 7/1996 | Raith | 370/329 |
| 5,778,075 | A * | 7/1998 | Haartsen | 380/272 |
| 5,826,172 | A * | 10/1998 | Ito et al. | 340/7.44 |
| 6,522,873 | B1 * | 2/2003 | Moles et al. | 455/343.1 |
| 7,961,676 | B2 * | 6/2011 | Seo et al. | 370/329 |
| 2005/0014519 | A1 | 1/2005 | Sinnarajah | |
| 2005/0148348 | A1 * | 7/2005 | Cramby et al. | 455/458 |
| 2007/0259699 | A1 * | 11/2007 | Homchaudhuri | 455/574 |
| 2008/0287145 | A1 | 11/2008 | Harris | |
| 2009/0215472 | A1 * | 8/2009 | Hsu | 455/458 |
| 2010/0159929 | A1 * | 6/2010 | Homchaudhuri | 455/436 |

\* cited by examiner

*Primary Examiner* — Charles Appiah
*Assistant Examiner* — Jaime Holliday
(74) *Attorney, Agent, or Firm* — Coats & Bennett PLLC

(57) ABSTRACT

In a GSM network, mobile stations monitor the paging channel of their respective paging group. Specifically, when a mobile station registers with the GSM network, the GSM network classifies the mobile station as belonging to one of two categories, a first category and a second category. Mobile stations belonging to the first category monitor the paging channel of their paging group at an interval defined by the GSM parameter BS-PA-MFRMS. Mobile stations belonging to the second category monitor the paging channel of their paging group at a second interval which is longer than that defined by the GSM parameter BS-PA-MFRMS.

28 Claims, 3 Drawing Sheets

METHOD AND ARRANGEMENT IN A TELECOMMUNICATION SYSTEM

RELATED APPLICATIONS

This application claims priority to U.S. Provisional Patent Application No. 61/303,020, filed Feb. 10, 2010 and incorporated by reference herein in its entirety.

TECHNICAL FIELD

The present invention discloses a method and arrangement in a GSM telecommunication system, in particular a method and arrangement that introduces a new and longer paging cycle for GSM devices, such as Machine Type Communication Devices (MTC) devices.

BACKGROUND

In a GSM (Global System for Mobile Communications) network today, each registered mobile station has to monitor its own paging group on the paging channel. This procedure is performed periodically, with a monitoring cycle which is between 0.47 and 2.12 seconds, depending on the parameter BS-PA-MFRMS, as defined in 3GPP TS 44.018 chapter 10.5.2.11. The length of the cycle is set in order to obtain an acceptable responsiveness for mobile station call set-up procedures without consuming too much battery lifetime from the mobile station.

In existing paging solutions, a mobile station's monitoring of its paging channel is done with a view to communication that is time critical, i.e. communication that has to be initiated as soon as possible after a mobile station's initial reception of an incoming paging message. This process means that each mobile station has to spend a rather significant amount of energy decoding information not intended for that mobile station.

SUMMARY

The present invention aims at reducing at least some of the disadvantages of present paging channel monitoring solutions.

This aim is achieved by means of a method for use in a GSM network which comprises monitoring by mobile stations in the GSM network of the paging channel of their paging group.

According to the method, when a mobile station registers with the GSM network, the GSM network classifies the mobile station as belonging to one of two categories. These two categories are such that the mobile stations of the first of the two categories monitor the paging channel of their paging group at an interval defined by the GSM parameter BS-PA-MFRMS and the mobile stations of the second of the two categories monitor the paging channel of their paging group at a second interval which is longer than that defined by the GSM parameter BS-PA-MFRMS.

This is useful due to the fact that, for devices such as, for example, certain types of Machine Type Communication, MTC, devices, the "ordinary" GSM paging speed might be unnecessary since it is known a priori what type of communication the device will carry out and it might also be known that this type of communication is not as time critical as other kinds of communication. If the paging channel monitoring is performed at less frequent intervals, less energy would naturally be consumed, leading to a reduced need for battery charging. Thus, if, for example, MTC devices, i.e. MTC mobile stations, are assigned to the group which uses the second interval, less energy will be consumed by those devices without "harming" their performance.

In some embodiments of the method, a mobile station of the second category identifies itself as being of the second category when it registers with the GSM network, and mobile stations which have not identified themselves in this manner are assumed by the GSM network to belong to the first category.

In some embodiments of the method, the mobile station identifies itself as belonging to the second category by means of transmitting an MS Classmark message to the GSM network.

In some embodiments of the method, the second interval is determined by means of multiplying the GSM parameter BS-PA-MFRMS by a factor which is communicated during a mobile station's registration procedure. In some such embodiments, the factor is communicated from the mobile station to the rest of the GSM network during the registration procedure. In other such embodiments, the factor is communicated to the mobile station from another component in the rest of the GSM network during the registration procedure.

In some embodiments of the method, a mobile station of the second category uses the GSM GMM periodic registration timer to activate its monitoring of the paging channel of its paging group according to the second interval. In some such embodiments, a mobile station monitors the paging channel of its paging group during a certain period of time after it has performed a periodic registration. In some such embodiments, the network only pages a mobile station within a predefined interval of time after the mobile station has performed a periodic registration.

In some embodiments of the method, the second interval is determined using the parameter BS-PA-MFRMS and/or the superframe and/or the hyperframe of the common control channel on which the paging channel is mapped.

The invention also discloses a mobile station arranged to use the method of the invention.

Thus, the mobile station is intended for use in a GSM network, and is arranged to monitor the paging channel of a paging group to which it belongs. The mobile station is arranged to perform this monitoring with a monitoring interval which is longer than that defined by the GSM parameter BS-PA-MFRMS.

In embodiments, the mobile station is arranged to, when it registers with the GSM network, send or receive information which is used by the GSM network to classify the mobile station as a mobile station which monitors the paging channel of its paging group at said monitoring interval.

In embodiments, the mobile station is arranged to identify itself when it registers with the GSM network as being a mobile station which monitors the paging channel of its paging group at said monitoring interval.

In embodiments, the mobile station is arranged to identify itself as being a mobile station which monitors the paging channel of its paging group at said monitoring interval by means of transmitting an MS Classmark message to the GSM network.

In embodiments, the mobile station is arranged to determine said monitoring interval by means of multiplying the GSM parameter BS-PA-MFRMS by a factor which is communicated during a mobile station's registration procedure. In some such embodiments, the mobile station is arranged to communicate the factor to the rest of the GSM network during the mobile station's registration procedure with the rest of the GSM network.

BRIEF DESCRIPTION OF THE DRAWINGS

The invention will be described in more detail in the following, with reference to the appended drawings, in which.

DETAILED DESCRIPTION

Figure 1:
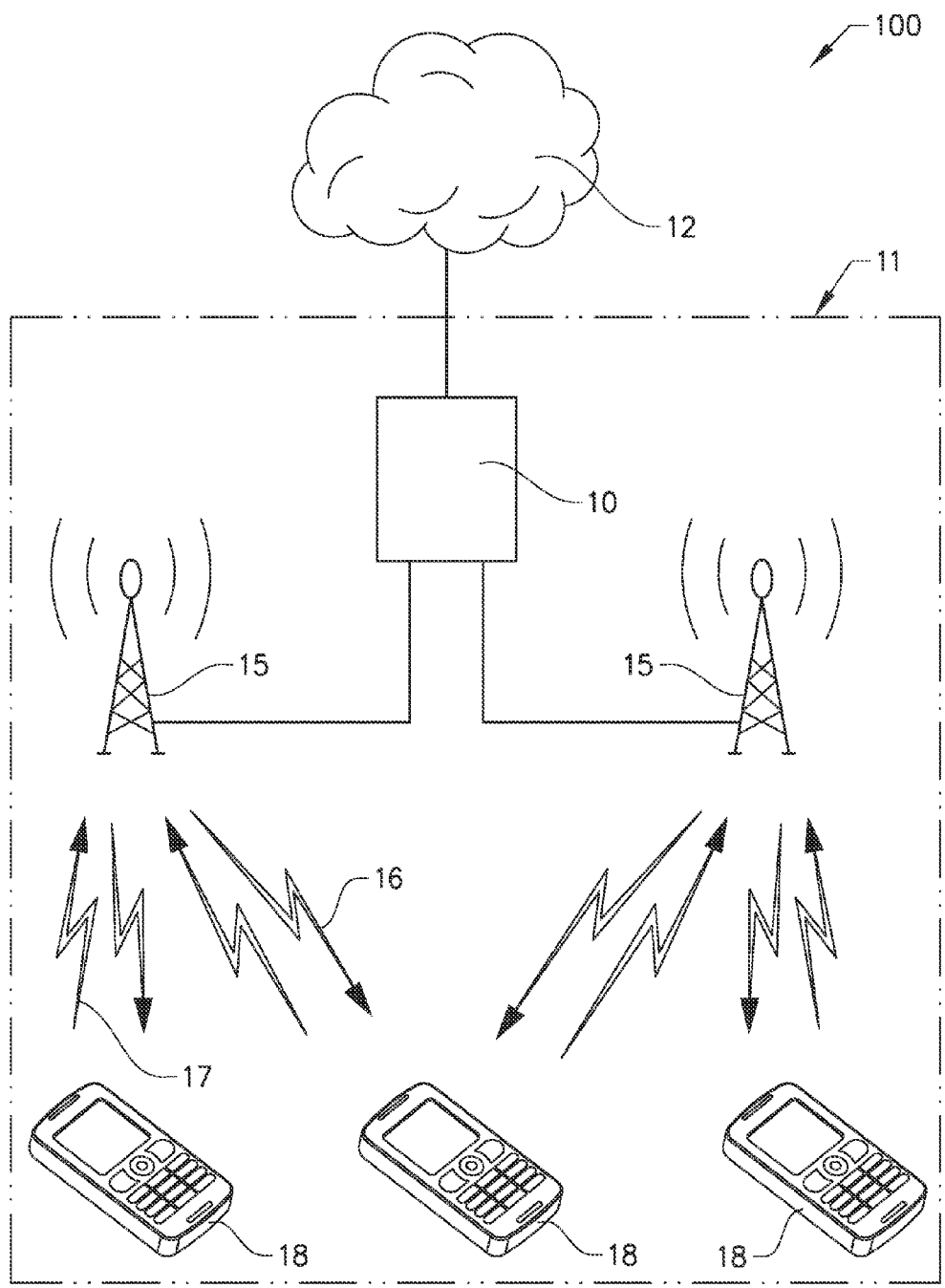
FIG. 1 shows a communications network system where the invention is applied.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a communication network system 100 including a Radio Access Network, RAN 11, such as the GSM Network. The RAN 11 comprises at least one Radio Base Station, RBS 15, and in FIG. 1 there are two RBSs 15 shown. The RBSs 15 are shown as being connected to a common Base Station Controller, BSC 10, although the RBSs 15 may also be connected to more than one BSC, and the RBSs 15 do not necessarily have to be connected to one and the same BSC. The RAN 11 is connected to a Core network, CN, 12. The RAN 11 and the CN 12 provide communication and control for a plurality of mobile stations, MS 18, each of which uses downlink, DL, channels 16 and uplink, UL, channels 17. For reasons of clarity, only one of the uplink channels is denoted 17 and only one of the downlink channels is denoted 16.

On the downlink channel 16, the RBSs 15 transmit to the mobile stations 18 at respective power levels, and on the uplink channel 17, the mobile stations 18 transmit to the RBS 15 at respective power levels.

The MSs 18 in the RAN 11 monitor a paging group to which they belong on a paging channel which is usually mapped on a GSM control channel, such as the Common Control Channel, the CCCH. The monitoring is carried out at regular intervals, and naturally, the more frequent the monitoring is carried out, the more energy and corresponding battery time will be consumed by an MS, in particular since the monitoring of each mobile station 18 is performed on a paging channel which is common to a number of mobile stations 18.

Some of the MSs 18 in the RAN 11 may be "traditional" MSs, i.e. MSs which are used for time critical application such as speech, streaming of data, Internet applications etc. In such applications, the traditional MSs need to monitor their paging channel frequently, although, since they belong to a paging group, they will be consuming battery lifetime in decoding information not intended for them.

Figure 2:
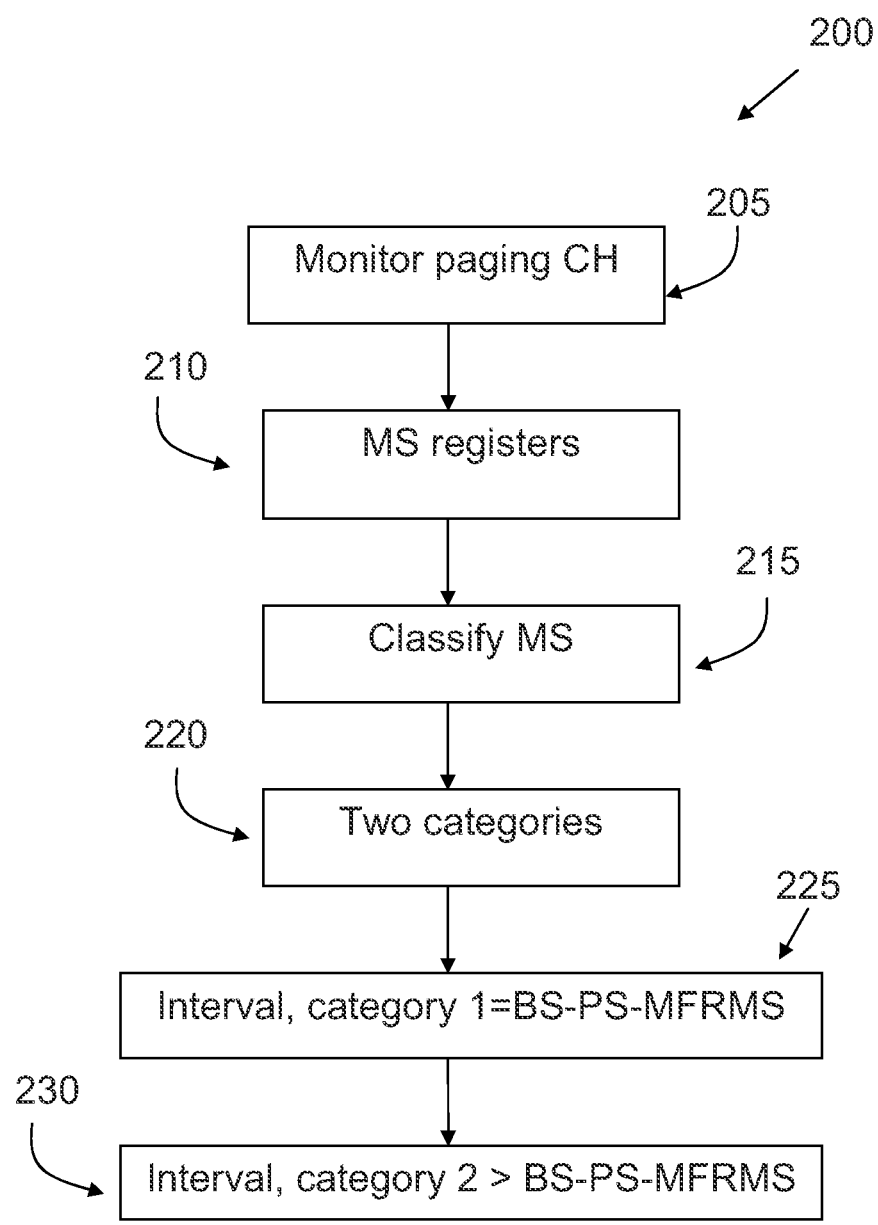
FIG. 2 shows a schematic flowchart of the method of the invention.

However, for some MS, for instance MSs which are used for so called MTC, Machine Type Communication, the communication is not always as time critical as for the applications exemplified previously. With reference to the method 200 shown in the flowchart in FIG. 2, the invention will now be described, and it will be shown how the invention can provide MSs such as MTC Ms and MSs for other less time critical applications with energy savings.

As shown in step 205, the mobile stations 18 monitor the paging channel of their paging group.

A mobile station 18 which is of a type with less time critical communication, such as, for example, an MTC mobile station, is identified by the GSM network 11 upon the mobile station's registering, step 210 with the GSM network. This identification of the mobile station serves to classify, step 215, the mobile station into, step 220, one of two categories, e.g. (in this example) "time critical" or "not so time critical", where the category "not so time critical" suitably comprises MTC mobile stations. In the example shown here, it is mobile stations of the category "not so time critical" which identify themselves, so that mobile stations which do not identify themselves are automatically classified as "time critical". Naturally, the opposite is also possible, as well as letting mobile stations of both categories identify themselves upon registering. In addition, the principle shown here can also be applied to a GSM network with more than two categories of mobile stations.

The identification by the GSM network of the mobile station as having communication which is "not so time critical" can be done in a number of different ways, examples of which are as follows: the mobile station, upon registering with the GSM network, sends a so called "MS Classmark message" in which the mobile station notifies the GSM network of certain of the mobile station's capabilities, following which the GSM network and the mobile station can initiate a "negotiation" regarding, for example, certain parameter values e.g. in the (GPRS) ATTACH REQUEST and the ATTACH COMPLETE message the value of the READY Timer (from 3GPP TS 24.008) is negotiated. In one embodiment, the mobile station clearly states to the GSM network that it is an MTC device, or merely that it is a "not so time critical" device. The latter can be derived e.g. from the priority indication carried in the Priority field in the initial access message (see 3GPP TS 44.060) or in a new dedicated indication in the Access Stratum (AS) layer (i.e. RRC message) or a new identifier in the Non-Access Stratum (NAS.

Alternatively, the mobile station can state to the GSM network that the mobile station supports the paging technique described in this document, for example by stating that the mobile station supports the 3GPP standard of a certain release, following which the GSM network then checks the mobile station's Home Location Register, HLR, to see if the mobile station is identified in the HLR as a mobile station which should have the longer paging interval described herein. Alternatively, a message from the mobile station to the GSM network could state that the mobile station supports the technique with longer paging intervals (i.e. cycles), and that the mobile station wants a certain set of parameters, including the length of the paging interval, set to certain values.

The mobile station can state the support mentioned either by adding it to an MS Classmark message or the message stating the mobile station's support could be defined as a new message. It may also be added as a new information element that carries the requested value from the MS to the network in any of the following messages: ATTACH REQUEST, ROUTING AREA UPDATE REQUEST or ACTIVATE PDP CONTEXT REQUEST. The negotiated value is sent back by the network to the MS in the existing messages ATTACH REQUEST COMPLETE, ROUTING AREA REQUEST ACCEPT, ACTIVATE PDP CONTEXT ACCEPT. In one embodiment, values that are negotiated are standalone information elements as the Requested READY timer value, as shown in 3GPP TS 24.008.

Returning now to the two categories of mobile stations, these two categories are thus categories which monitor the paging channel of their paging group at two different intervals. As shown in step 225 in FIG. 2, the first category monitors its paging channel at an interval which is defined by the parameter BS-PA-MFRMS. The second category as shown in step 230, monitors its paging channel at an interval which is longer than that defined by the parameter BS-PA-MFRMS, and is thus the category referred to above as "not so time critical", e.g. a group of MTC mobile stations. The interval with which a mobile station monitors the paging channel of its paging group will in the following also be referred as "the paging cycle", and, in particular, the longer such interval of the second group will be referred to as "the longer paging cycle".

The longer paging cycle can be determined in a number of ways, as will be explained in the following.

In embodiments, the longer paging cycle is determined by means of multiplying the GSM parameter BS-PA-MFMRS by a factor which is communicated during the registration procedure. In some such embodiments, the factor is communicated from a mobile station to the rest of the GSM network during the registration procedure, whilst, in other embodiments, the factor is communicated to a mobile station 18 from another component in the rest of the GSM network during the registration procedure. Accordingly, either the mobile station can inform the rest of the network, or the vice versa, where, in the latter version, it is suitably the mobile station's HLR which has the information regarding which factor that is to be used, and which communicates this to the mobile station as well as to other relevant components of the GSM network.

Thus, in order to determine the longer paging cycle, the "normal" paging cycle length (given by the parameter BS-PA-MFRMS) is multiplied by a number that is communicated to the network based on, for example, the mobile station's subscription, and makes it possible to, for example, create a standardized list of multiplication factors which are supported, so that the list is known to and supported by both the mobile station and the network. The mobile station only has to know which multiplication factor that is used in order to determine the longer paging cycle, and the same also goes for "the network side", i.e. the rest of the GSM network. The longer paging cycle which is determined in this manner is used by the mobile station in order to know when to "wake up", for example from an idle state, and monitor the paging channel of its paging group, and is used by the "network side" to know when then mobile station will be monitoring its paging channel. In embodiments, the mobile station could signal that it wants the longer paging cycle, and the network then informs the mobile station of which multiplication factor in the list to use, or, alternatively, that the mobile station explicitly tells the network which multiplication factor that the mobile station wants to use.

Suitably, the MS wakes up for one paging block, although signaling can also be used to make the MS monitor more than one paging block, for example so called signaling so called "paging extended" to the MS, which makes the MS monitor either the paging block which follows immediately after "its own" paging block, or the next but one paging block.

At present, according to the applicable GSM standard, the GSM parameter BS-PA-MFRMS can take values between 2 and 9, and states the number of multi-frames for transmission of PAGING REQUEST messages to the same paging group. As disclosed herein, the longer paging cycle can then be obtained by multiplying the BS-PA-MFRMS parameter by a given factor or value.

As stated previously, the factor in question is communicated during the registration procedure, and is provided by either MS or any part of the network, such as, for example, the Base Station Subsystem, BSS, the Mobile Switching Centre, MSC, the Operation Support System, OSS, or the Home Location register/Visitor Location Register, HLR/HLR. The table below gives an indication of the length of the longer paging cycle which can be obtained by means of different multiplication factors:

|  | Value of BS-PA-MFRMS | | |
| --- | --- | --- | --- |
| Multiplication factor | 2 | 6 | 9 |
| 1 | 0.47 sec | 1.41 sec | 2.12 sec |
| 100 | 47 sec | 141 sec | 211 sec |
| ... | | | |
| 5000 | 0.65 h | 1.96 h | 2.94 h |
| 50000 | 6.54 h | 19.62 h | 29.43 h |

This embodiment is centred around the Radio Access Network, the RAN, since the Core Network, the CN, is "Um i/f unaware", i.e. the CN is unaware of the radio interface and/or the access methods used by the RAN.

In a solution without the present invention, the RAN 12 determines which paging group that a mobile station 18 monitors in order to know when it is appropriate to send paging message to the mobile station 18. In the same manner, in the present invention, the RAN 12 determines the paging group of a mobile station which uses the longer paging cycle, but also needs to know the length of the longer paging cycle of the mobile station in order to know when it is appropriate to send a paging message to the mobile station. This can also be seen as letting the RAN determine a fictitious paging group for a mobile station with a longer paging cycle than "normal" ("pre-invention") paging groups.

The concept of a fictitious paging group for mobile stations with the longer paging cycle will be explained in the following, where we will first briefly describe how "normal" paging groups are determined by the RAN: Assume that the parameter BS-PA-MFRMS is set to a value of 2, and also assume that there are 9 CCCH blocks per GSM multiframe. In such a case, there will be a total of 18 paging groups in one paging cycle. If a mobile station has 001 as the last digits of its IMSI, the mobile station will monitor paging group number 1, and will then "rest" for 17 paging blocks (groups) and will then monitor paging group 1 again.

Assume now that we instead have a system with the longer paging cycle of the invention, in which the parameter BS-PA-MFRMS is set to a value of 2 and there are 9 CCCH blocks per GSM multiframe. In such a system, if the multiplication factor MF which is applied to obtain the longer paging cycle is set to 1000, the Paging message sent from the MSC is provided with additional info comprising the factor MF, and using that info, the RAN 12 determines the (fictitious) paging group for a mobile station which uses the longer paging cycle, and thus in effect obtains the longer paging cycle.

In one embodiment, such a (fictitious) paging group numbered in the range of 0 to N−1, where N is a positive integer, is determined as follows:

PAGING_GROUP(0 ... ($N$−1)×MF)==((IMSI mod 1000)mod($BS\_CC\_CHANS$×$N$×MF))mod($N$× MF)

Here, MF is the multiplication factor which is either communicated from the mobile station to the rest of the GSM network or to the mobile station from the rest of the GSM network. In the embodiment where MF is communicated from the mobile station, it is suitably retrieved from the SIM card of the mobile station, and in the embodiment where it is communicated to the mobile, it is suitably determined from information stored in the HLR, for example based on information regarding the subscription of the mobile station. IMSI is the International Mobile Station Identity of the mobile station.

Based on a decision dependent on the device implementation choice, the mobile station may renegotiate its value of paging cycle using existing procedures e.g. LAU/RAU/TAU, Local Area Update, Routing Area Update, Tracking Area Update, or any combination of these. One of the triggers for a negotiation of the paging cycle could be the event where the device gets detached/attached from/to an external power supply, since power consumption becomes more or less important depending on the mobile station being attached to an external power supply or not. The mobile would then, for example, only monitor its paging group every $100^{th}$ as compared to what is demanded by the parameter BS-PA-MFRMS if the multiplication factor is 100.

In another embodiment of the invention, a periodic registration timer is used to activate a mobile station's monitoring of its paging channel, which is used in order to obtain a paging cycle which is longer than that defined by the parameter BS-PS-MFRMS. In such embodiments, the mobile station 18 "wakes up" from an idle state during which it doesn't monitor its paging channel, and, for a specified interval of time, monitor the paging channel of its paging group before going back to "sleep", i.e. returning to the idle state.

The communication network system 100 knows this, and only pages the mobile station 18 if a periodic registration recently occurred, i.e. if the mobile station is within the specified interval of time mentioned previously. The registration timer which is used, for example the registration timer used for the procedures LAU/RAU/TAU, is not known in the RAN 11, and thus these embodiments are more focused on the CN 12. Suitably, the status of a mobile station 18 with regard to the specified interval of time mentioned previously is monitored by the MSC, the Mobile Switching Centre, and the MSC makes the decision when to send a page to a mobile station or not. This status indication, i.e. the status of a mobile station 18 with respect to its monitoring of the paging channel of its paging group, could also in some embodiments be communicated to the server which has initiated the communication, so that the server in question knows when it is OK to initiate communication to a specific device, i.e. a specific mobile station.

Regarding the nature of the periodic registration timer used in this embodiment, the following can be said: In GSM, the timer T3212 is the timer value which controls the CS (Circuit Switched) periodic registration (or periodic Location Area Update) interval while the timer T3312 controls the GMM periodic registration (Routing Area Update) procedure, see 3GPP TS 24.008. The timer T3212 has a value range from 0 to 255 and is set in decihours, with examples of commonly used values being in the range of 2-4 hours. Suitably, this timer, i.e. T3312, is also used to control a mobile station's monitoring of its paging channel. In such embodiments, the mobile station would be in a "sleep state" (i.e. not monitoring the paging channel), and when the mobile station wakes up to perform periodic registration such as, e.g. the RAU, the mobile station will also start to monitor its paging group in a "normal" manner, i.e. as specified in the relevant GSM specifications. This will occur during a fixed period of time, e.g. a few minutes, before "going back to sleep", i.e. before the mobile station 18 resumes the idle state. The mobile station 18 suitably communicate this capability to the rest of the network during the attach procedure, or alternatively, during the registration procedure.

In addition, in embodiments which employ a periodic registration timer as described here, based on a decision dependent on the device implementation choice, a mobile station may re-negotiate its paging cycle and switch to the "normal" paging procedure (i.e. the paging procedure based on BS-PA-MFRMS), with the re-negotiation being performed by means of existing procedures e.g. LAU/RAU/TAU or any combination of these. A suitable trigger for a re-negotiation of the paging cycle is, for example, the event where the mobile station is detached/attached from/to an external power supply, since power consumption becomes more or less important depending on the mobile station being attached to an external power supply or not.

In further embodiments, existing GSM parameters like BS-PA-MFRMS and the higher level frame structures like superframe or even hyperframe structure are used to control the length of the long paging cycle. Such embodiments allow a mobile station to monitor its paging group on a superframe or hyperframe time basis. These embodiments are flexible in that they do not require new parameter values to be communicated to the GSM network, if a parameter "m" is fix, m being the number of super frames in the long paging cycle. In these embodiments, m is either a fix value or, alternatively, a range of values. In such embodiments, the only indication that would be necessary to communicate to the GSM network is if a normal or a long paging cycle is used by a mobile station.

In such embodiments, i.e. embodiments which use existing GSM parameters like BS-PA-MFRMS and the higher level frame structures, use is made of the paging channel in the following manner: the paging channel is mapped on the GSM common control channel, CCCH, and follows a multi-frame structure of 51 TDMA frames per multi-frame. A 51-multiframe takes approximately 235 ms to transmit. The next level in the GSM frame structure is the superframe, which comprises 26 of the 51-multiframes, and is thus approximately 6.12 sec in duration. This frame structure is, in these embodiments, utilized to extend the paging cycle, i.e. to obtain the long paging cycle, as follows:

The paging group that a mobile station belongs to is basically determined by the last three digits in the IMSI number of the mobile station together with the cell configuration (BS-PA-MFRMS and number of available paging blocks in a 51-multiframe). The following equation is used to determine the paging group of a mobile station, see also 3GPP TS 45.002 chapter 6.5.2:

$$PAGING\_GROUP(0 \ldots N-1) == ((IMSI \bmod 1000) \bmod (BS\_CC\_CHANS \times N)) \bmod N$$

where: N is the number of paging blocks "available" on one CCCH, which equals the number of paging blocks "available" in a 51-multiframe on one CCCH multiplied by the parameter BS_PA_MFRMS.

IMSI=International Mobile Subscriber Identity, as defined in 3GPP TS 23.003.

BS_CC_CHANS defines the number of basic physical channels supporting common control channels (CCCHs) on the BCCH carrier.

(mod=Modulo and div=Integer division)

Now, the paging cycle length could be increased by using the superframe or a multiple of the superframe to force the mobile to wake up and monitor the paging channel. This means that the mobile would only monitor its own paging group once every superframe (or multiple of the superframe). The equation to calculate the paging group is then changed to:

$$PAGING\_GROUP(0 \ldots N-1) == ((IMSI \bmod 1000) \bmod (BS\_CC\_CHANS \times N)) \bmod N$$

Where:

N is the number of paging blocks "available" on one CCCH, which equals the number of paging blocks "available" in a 51-multiframe on one CCCH multiplied by the parameter BS_PA_MFRMS, multiplied by 26 and by a parameter "m".

The parameter m is the number of super-frames in the long paging cycle, and m is either a fixed value or a range of values. The parameter 'm' as well as the indication of whether superframe of hyperframe is used can be either associated with the subscription or provided to the CN 12 in the enhanced registration signaling procedures (attach procedure, location, routing, tracking area update procedure). Based on a decision dependent on the device implementation choice, a mobile station can renegotiate its value of the paging cycle using existing procedures e.g. LAU/RAU/TAU or any combination of these. One of the triggers for a negotiation of the paging cycle could be the event where the device gets detached/attached from/to an external power supply.

The value m as well as the information about what type of frame structures shall be used will be provided to the RAN by the CN in the enhanced paging message or alternatively in other procedures used to create contexts associated with the device in the RAN.

It is RAN implementation choice to manage paging messages received from the CN. Dependent on current load paging messages may be queued or discarded. As an additional functionality there could be a mechanism to inform CN about dropped paging messages due to either congestion or due to the fact that they were received in the RAN well outside the transmission window of the associated paging group. CN could use such information to refrain from further re-transmissions as well as a trigger for possible signaling towards other nodes and/or service layer.

Figure 3:
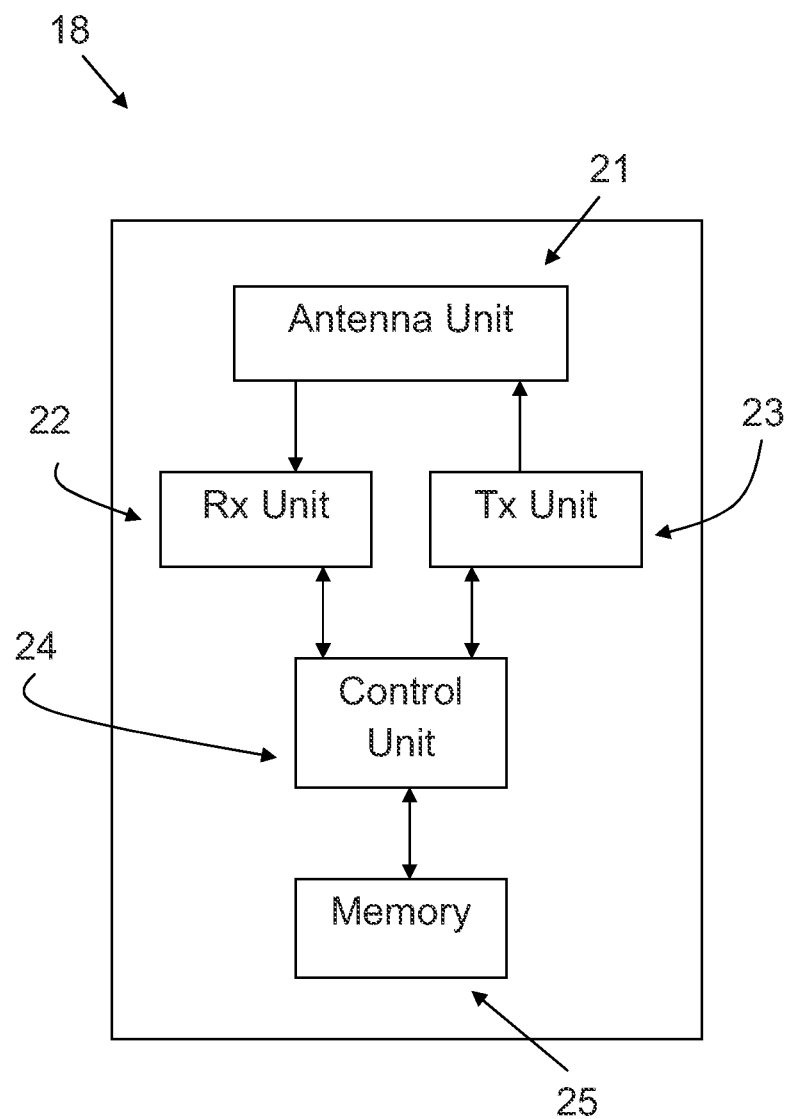
FIG. 3 shows a schematic block diagram of a mobile station of the invention.

In addition to the method described above, the invention also discloses a mobile station 18, a schematic block diagram of which is shown in FIG. 3. As shown there, the mobile station 18 comprises an antenna unit 21 for communication with one or more RBSs 15, as well as comprising a receiver unit 22 and a transmitter unit 23, also used for communication with one or more RBSs 15.

The mobile station 18 also comprises a control unit 24, for control of the mobile station 18 in general, and also for control of the transmitter and receiver units in particular. In addition, the mobile station 18 also comprises a memory unit 25, where the mobile station may store parameters for operation as well as executable code for the control unit 24, if the control unit 24 is a processor of some kind, such as, for example, a microprocessor.

The mobile station 18 is arranged to function according to the method described above. Thus, the mobile station 18 is intended for use in a GSM network, and is arranged to monitor the paging channel of a paging group to which it belongs, which is done by means of the antenna unit 21, the receiver unit 22 and the control unit 24.

The mobile station is arranged to perform the monitoring of its paging channel according to a monitoring interval which is longer than that defined by the GSM parameter BS-PA-MFRMS.

In embodiments, the mobile station 18 is arranged to, when it registers with the GSM network, send or receive information which is used by the GSM network to classify the mobile station 18 as being a mobile station which monitors the paging channel of its paging group at the monitoring interval mentioned, i.e. a monitoring interval which is longer than that defined by the GSM parameter BS-PA-MFRMS.

In embodiments, the mobile station 18 is arranged to determine the monitoring interval by means of multiplying the GSM parameter BS-PA-MFRMS by a factor which is communicated during a mobile station's registration procedure.

In embodiments, the mobile station 18 is arranged to communicate the factor to the rest of the GSM network 11 during the mobile station's registration procedure with the rest of the GSM network 11.

In embodiments, the mobile station 18 is arranged to receive the factor from another component in the rest of the GSM network 11 during the mobile station's registration procedure with the rest of the GSM network 11.

In embodiments, the mobile station is arranged to use the GSM GMM periodic registration timer to activate its monitoring of the paging channel of its paging group according to the monitoring interval.

In embodiments, the mobile station is arranged to monitor the paging channel of its paging group during a certain period of time after it has performed a periodic registration. In some such embodiments, the mobile station 18 is arranged to be paged by the network within a predefined interval of time after the mobile station 18 has performed a periodic registration.

In embodiments, the mobile station 18 is arranged to determine the monitoring interval using the parameter BS-PA-MFRMS and/or the superframe and/or the hyperframe of the common control channel on which the paging channel is mapped.

In embodiments, the mobile station 18 is arranged to renegotiate its length of the second interval with the rest of the GSM network 11 after the registration procedure. In some such embodiments, the mobile station 18 is arranged to carry out the renegotiation using one of the procedures, Local Area Update, LAU, Routing Area Update, RAU, Tracking Area Update, TAU, or a combination of any of those procedures. In some such embodiments, the mobile station 18 is arranged to initiate the renegotiation when the mobile station is attached or detached to/from an external power supply.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A method implemented by a mobile station that is configured for use in a GSM (Global System for Mobile Communications) network and that belongs to a paging group, the method comprising:
monitoring, by the mobile station, a paging channel of the GSM network transmitted for said paging group with a monitoring interval that comprises a defined number of GSM superframes or GSM hyperframes of a common control channel on which the paging channel is mapped;
when registering with the GSM network, sending classification information to or receiving classification information from a node in the GSM network, the classification information directly or indirectly classifying the mobile station as a mobile station that monitors the paging channel of a paging group with said monitoring interval; and
after registering with the GSM network, renegotiating the length of said monitoring interval.

2. The method of claim 1, further comprising identifying the mobile station to the GSM network, when registering with the GSM network, as belonging to a category of mobile stations that monitor the paging channel with said monitoring interval.

3. The method of claim 2, wherein said identifying comprises transmitting an MS Classmark message to the GSM network.

4. The method of claim 1, wherein said monitoring interval is specified in terms of a defined multiple of said superframes.

5. The method of claim 1, wherein said monitoring interval is specified in terms of a defined multiple of said hyperframes.

6. The method of claim 1, further comprising using the GSM GMM (GSM Mobility Management) periodic registration timer to activate said monitoring.

7. The method of claim 6, wherein said monitoring comprises monitoring the paging channel of said paging group during a certain period of time after having performed a periodic registration.

8. The method of claim 6, further comprising receiving a page from the GSM network within a predefined interval of time after having performed a periodic registration.

9. The method of claim 1, wherein registering with the GSM network comprises using at least one of a Local Area Update (LAU) procedure, a Routing Area Update (RAU) procedure, and a Tracking Area Update (TAU) procedure.

10. The method of claim 1, further comprising initiating said renegotiation when the mobile station is attached to or detached from an external power supply.

11. The method of claim 1, further comprising determining to monitor the paging channel with said monitoring interval responsive to determining that communications of the mobile station are deemed non-time-critical.

12. A mobile station for use in a GSM (Global System for Mobile Communications) network and belonging to a paging group, the mobile station comprising a processor and a memory, said memory containing instructions executable by said processor whereby said mobile station is configured to:
monitor a paging channel of the GSM network transmitted for said paging group with a monitoring interval that comprises a defined number of GSM superframes or GSM hyperframes of a common control channel on which the paging channel is mapped;
when registering with the GSM network, send classification information to or receive classification information from a node in the GSM network, the classification information directly or indirectly classifying the mobile station as a mobile station that monitors the paging channel of a paging group with said monitoring interval; and
after registering with the GSM network, renegotiate the length of the monitoring interval.

13. The mobile station of claim 12, configured, when registering with the GSM network, to send the classification information to the node in the GSM network.

14. The mobile station of claim 12, configured, when registering with the GSM network, to identify itself as being a mobile station that monitors the paging channel of said paging group with said monitoring interval.

15. The mobile station of claim 14, configured to identify itself by transmitting an MS Classmark message to a node in the GSM network.

16. The mobile station of claim 12, wherein said monitoring interval is specified in terms of a defined multiple of said superframes.

17. The mobile station of claim 12, wherein said monitoring interval is specified in terms of a defined multiple of said hyperframes.

18. The mobile station of claim 12, configured to use the GSM GMM (GSM Mobility Management) periodic registration timer to activate said monitoring.

19. The mobile station of claim 18, configured to monitor the paging channel of said paging group during a certain period of time after having performed a periodic registration.

20. The mobile station of claim 18, configured to receive a page from the GSM network within a predefined interval of time after having performed a periodic registration.

21. The mobile station of claim 12, configured to renegotiate said length using at least one of a Local Area Update (LAU) procedure, a Routing Area Update (RAU) procedure, and a Tracking Area Update (TAU) procedure.

22. The mobile station of claim 12, configured to initiate the renegotiation when the mobile station is attached to or detached from an external power supply.

23. The mobile station of claim 12, wherein the mobile station is configured to determine to monitor the paging channel with said monitoring interval responsive to determining that communications of the mobile station are deemed non-time-critical.

24. A method in a GSM (Global System for Mobile Communications) network, the method comprising:
registering a mobile station with the GSM network;
responsive to said registering, classifying the mobile station as belonging to one of at least two categories, including a first category and a second category, wherein mobile stations belonging to the first category monitor a paging channel of the GSM network at an interval defined by the GSM parameter BS-PA-MFRMS and mobile stations belonging to the second category monitor a paging channel of the GSM network at an interval that comprises a defined number of GSM superframes or GSM hyperframes of a common control channel on which the paging channel is mapped; and after registering the mobile station with the GSM network, renegotiating the length of said interval.

25. The method of claim 24, wherein said classifying comprises classifying the mobile station as belonging to the second category if the mobile station identifies itself as belonging to that second category when registering with the GSM network, and otherwise classifying the mobile station as belonging to the first category.

26. The method of claim 24, wherein mobile stations belonging to the second category monitor the paging channel of the GSM network at an interval that is specified in terms of a defined multiple of said superframes.

27. The method of claim 24, comprising classifying the mobile station as belonging to the second category responsive to determining that communications of the mobile station are deemed non-time-critical.

28. The method of claim 24, wherein mobile stations belonging to the second category monitor the paging channel of the GSM network at an interval that is specified in terms of a defined multiple of said hyperframes.

* * * * *